United States Patent [19]

Russell

[11] Patent Number: 5,325,599

[45] Date of Patent: Jul. 5, 1994

[54] GAUGING APPARATUS AND PROCESS FOR SETTING ANTIFRICTION BEARINGS

[75] Inventor: Daniel T. Russell, East Sparta, Ohio

[73] Assignee: The Timken Company, Canton, Ohio

[21] Appl. No.: 992,542

[22] Filed: Dec. 17, 1992

[51] Int. Cl.⁵ ............................................. G01B 5/02
[52] U.S. Cl. ...................................... 33/517; 33/203; 33/DIG. 17
[58] Field of Search ......... 33/517, 600, 203, DIG. 17; 29/724

[56] References Cited

U.S. PATENT DOCUMENTS 2,627,120  2/1953  Hotchkiss ........................ 33/517 X
4,150,468  4/1979  Harbottle ................. 33/DIG. 17 X
4,993,165  2/1991  French et al. .................... 33/517 X Primary Examiner—William A. Cuchlinski, Jr.
Assistant Examiner—Alvin Wirthlin
Attorney, Agent, or Firm—Polster, Lieder, Woodruff & Lucchesi

[57] ABSTRACT

An apparatus for setting bearings that support a shaft in a housing in effect projects critical surfaces from within the housing out of the housing where the axial distance between them may be measured. Where the bearings are tapered roller bearings, a measuring element seats against tapered raceways and indeed has two tapers so that it may be utilized with bearings having differing tapers on their raceways.

18 Claims, 3 Drawing Sheets

GAUGING APPARATUS AND PROCESS FOR SETTING ANTIFRICTION BEARINGS

BACKGROUND OF THE INVENTION

This invention relates in general to setting antifriction bearings and more particularly to a gauging apparatus and process for setting such bearings.

A shaft which rotates within a housing requires bearings of some type to support it in the housing, and where the shaft must rotate with precision or carry significant radial and axial loads, the bearings are often single row tapered roller bearings. When mounted in pairs, these bearings must be adjusted against each other to control the end play or preload in the bearings, or in other words, to bring the bearing to the proper setting. Too much end play detracts from the stability of the shaft. Preload, while keeping the shaft rotating about a fixed axis, if excessive, will produce too much friction within the bearings and cause them to experience early failure.

Within a pair of single row tapered roller bearings the setting depends on the axial spacing between the inner races or cones of the two bearings and the axial spacing between the outer races or cups of the two bearings. Various procedures and appliances exist for determining the proper spacing. Changing the spacing between either the cones or the cups will alter the setting for the combination.

Tapered roller bearings find widespread use in automotive equipment—from small automobiles to large trucks. In the typical rear wheel drive vehicle, the longitudinal drive or propeller shaft is connected to a pinion shaft which forms part of the vehicle's differential. That shaft rotates on two single row tapered roller bearings which are located in a housing. The shaft must rotate with considerable precision, lest the pinion carried by it will not mesh properly with the large ring gear in the differential and thereby produce noise and excessive wear. To achieve this precision, the shaft and housing must not only be machined accurately, but the bearings must be set properly to a condition of slight preload where no radial or end play exists in the pinion shaft.

Several procedures exist for setting these bearings. One of the more popular for setting the pinion shaft bearings of automotive axles controls the setting of the bearings with a spacer located between the inner races or cones. Typically, the cones are clamped between the pinion and a drive flange, which is in turn secured by a nut, with the spacer determining the distance between the two cones and hence the setting of the bearings.

But selecting the length of the spacer for a long time remained a formidable and time-consuming task, since it in essence relied on a trial and error procedure. With each new spacer, the pinion shaft would be rotated to determine the amount of torque transmitted by the bearings, and when the torque fell within an acceptable range, one assumed that the assembly contained a spacer of proper length.

A procedure developed by The Timken Company eliminates the trial and error procedure by measuring the spacing between the cones, notwithstanding their inaccessibility within the housing. In effect, the space separating the opposing faces of the cones is projected out of the housing where it can be measured. This procedure, however, utilizes a gauge which is dedicated to only bearings of a single type or series in that the gauge has surfaces which match the taper of the raceways for the bearings of only that series. Thus, where an axle assembly line carries axles having bearings of more than one series, only the axles having bearings to which the gauge is dedicated can have their bearings adjusted with the improved procedure. More traditional and time consuming procedures must be used for the remaining axles or else additional gauges must exist along the line for those remaining axles.

The present invention resides in a gauging apparatus which in effect projects surfaces of antifriction bearings out of a housing in which such bearings are located so that distances between critical surfaces may be measured remote from the housing. The apparatus has the capacity to accommodate two different types or series of bearings without undergoing modifications. This invention also resides in a process embodied in the apparatus.

DESCRIPTION OF THE DRAWINGS

In the accompanying drawings which form part of the specification and wherein like numerals and letters refer to like parts wherever they occur.

DETAILED DESCRIPTION

Figure 1:
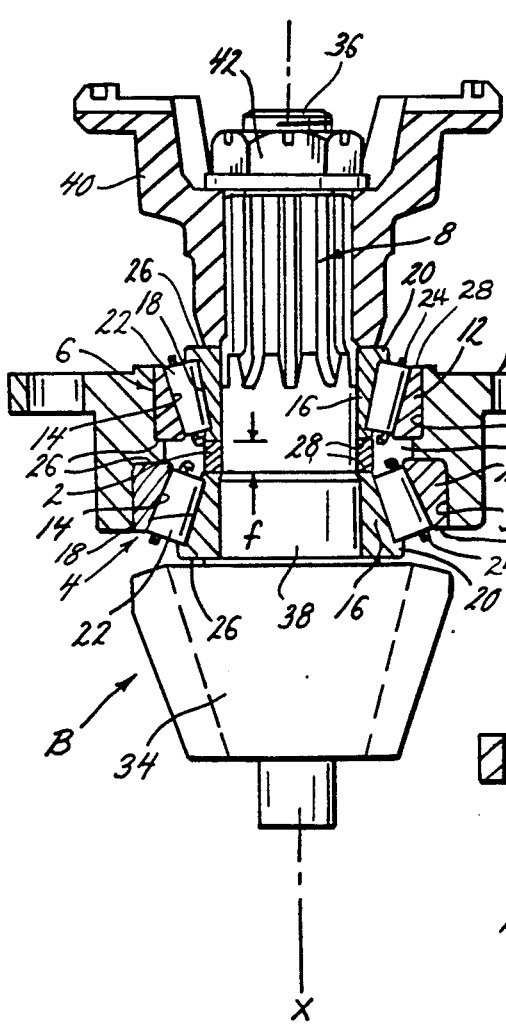
FIG. 1 is a sectional view of a typical pinion assembly, the bearings of which are set using the gauging apparatus and process of the present invention.

Referring now to the drawings, the present invention represents a refinement of an existing gauging apparatus A (FIG. 2) used in the manufacture of an assembly B (FIG. 1) to determine the length of a spacer 2 that fits between two tapered roller bearings 4 and 6 to establish the setting for those bearings 4 and 6 in the assembly B. Actually, the bearings 4 and 6 support a shaft 8 within a housing 10 which also forms part of the assembly B. Here the shaft 8 is the pinion shaft of an automotive differential. As such, the housing 10 is bolted to the main differential housing. With minor modifications, the gauging apparatus A may be used to adjust bearings for other machinery, but even so the apparatus A is dedicated to tapered roller bearings of only one type or series. It has no use with a tapered roller bearing of different diameter or different taper, that is, of another series. With other modifications the apparatus A has utility with other types of antifriction bearings, as long as they are the angular type, and as such are capable of taking thrust loading as well as radial loading.

The two bearings 4 and 6 (FIG. 1) are conventional tapered roller bearings mounted in the indirect configuration to establish an axis X of rotation for the shaft 8. Each includes an outer race or cup 12 having an inwardly presented raceway 14 which is tapered with respect to the axis X and an inner race or cone 16 having an outwardly presented raceway 18 which is likewise tapered with respect to the axis X. The cone 16 also has a thrust rib 20 at the large diameter end of its raceway 18. The cone raceway 18 lies within and faces the cup raceway 14 and between the two raceways 14 and 18 are tapered rollers 22 arranged in a single row with their large ends against the thrust rib 20 of the cone 16. A radial load transmitted through the rollers 22 will exert an axially directed force on the rollers 22, and that force would expel the rollers 22 from the bearings 4 or 6 were it not for the thrust rib 20 on the cone 16. Finally, each bearing 4 or 6 has a cage 24 which maintains the proper spacing between the rollers 22 and further holds the rollers 22 around the cone 16 when the cone 16 is withdrawn from the cup 12. Each bearing 4 and 6, being a tapered roller bearing, will take both radial and axial loads. The axial or thrust loads are transmitted to the bearings 4 and 6 at the large end faces of their cups 12 and cones 16, these faces being commonly referred to as the back faces 26. The opposite end faces of the cups 12 and cones 16 are known as the front faces 28.

The housing 10 contains a bore 30 (FIG. 1) and a counterbore 32 at each end of the bore 30. The counterbores 32 open out of opposite ends of the housing 10 and receive the bearings 4 and 6. Actually, the cup 12 of the bearing 4 is pressed into the one counterbore 32 with its backface 26 against the shoulder at the end of that counterbore 32. The cup 12 of the bearing 6 is pressed into the other counterbore 32 with its backface 26 against the shoulder at the end of that counterbore 32. This presents the back faces 26 of the cups 12 toward each other and the backfaces 26 of the two cones 16 away from each other, and otherwise orients the bearings 4 and 6 in the indirect configuration. As such, the two bearings 4 and 6 in combination will take thrust loads in either axial direction, and of course radial loads as well.

The shaft 8 carries a pinion 34 (FIG. 1) at one end and is provided with threads 36 at its opposite end. Between the pinion 34 and threads 36 it has a cylindrical surface 38 which lies mostly within the housing 10. The cones 16 of the two bearings 4 and 6 fit over the surface 38 with their back faces 26 presented away from each other. Indeed, the back face for the cone 16 of the bearing 4 lies against the pinion 34 or perhaps is separated from the pinion 34 with a shim so as to position the pinion 34 properly within the main differential housing. The back face 26 of the cone 16 for the bearing 6, on the other hand, abuts a drive flange 40 which likewise fits around the shaft 8, it being engaged with the shaft 8 through a spline. The drive flange 40 in turn is held on the shaft 8 with a nut 42 which engages the threads 36. Indeed, the nut 42 is turned down over the threads 36 to firmly clamp the two cones 16, the spacer 2 and the drive flange 40 between it and the pinion 34.

Figure 2:
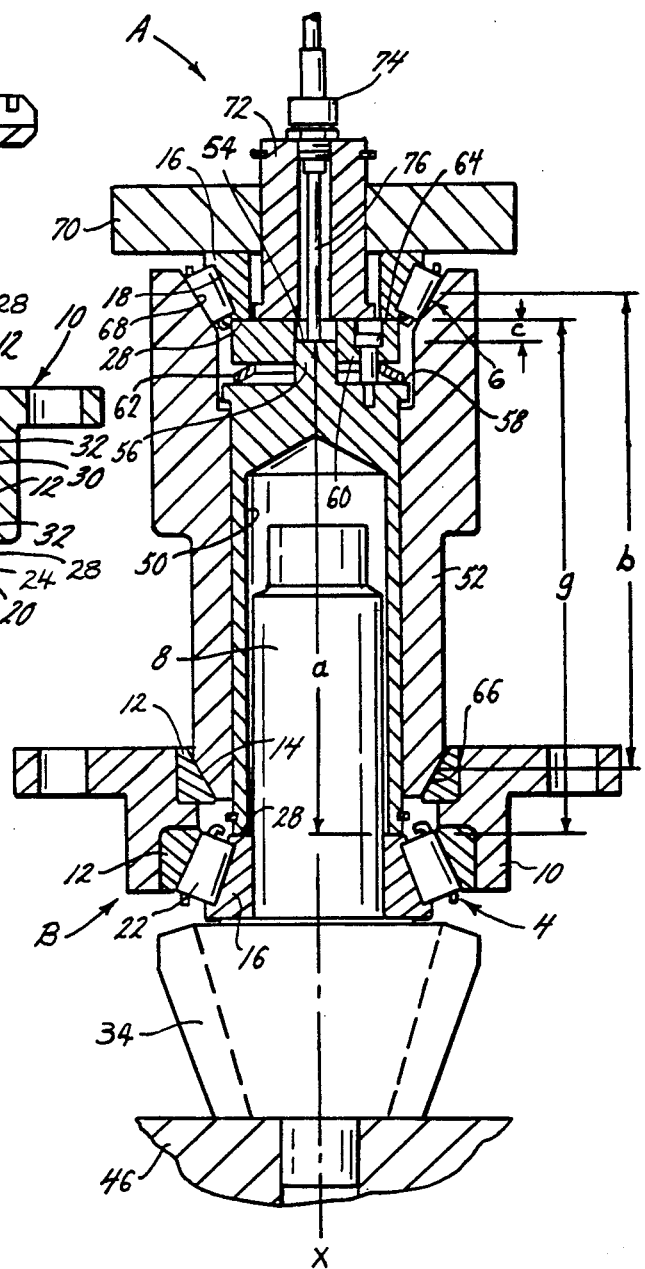
FIG. 2 is a sectional view of a typical pinion assembly with a prior art gauging apparatus over which the gauging apparatus of the present invention represents an improvement.

The front faces 28 of the cones 16 for the two bearings 4 and 6 are presented toward each other along the shaft 8 and abut the ends of the spacer 2, so the spacer 2 determines the distance between the two cones 16 (FIG. 1). If the spacer 2 is too short, the bearings 4 and 6 will operate under excessive preload; if too long, excessive end play. In other words, the spacer 2 controls the setting for the two bearings 4 and 6.

Since the front faces 28 of the two cones 16 lie within the housing 10 and are totally obscured, one cannot, at least directly, measure the distance between them to determine the proper length for the spacer 2. The gauging apparatus A in effect projects critical surfaces of the bearing 6 out of the housing 10 so that the distance between the front faces 28 of the cones 16 may be measured with relative ease.

The gauging apparatus A includes (FIG. 2) a fixture 46 for supporting the shaft 8 with its pinion 34 presented downwardly and the cone 16 and rollers 22 of the bearing 4 presented upwardly. The cone 16 for the other bearing 6, however, is detached from the shaft 8. The housing 10, with the two cups 12 fitted to the bores 30, is then advanced over the shaft 8 until the lower cup 12, which is the cup 12 for the bearing 4, comes against the rollers 22 that lie around the lower cone 16.

In addition, the gauging apparatus A includes two measuring elements, namely an inner element 50 and an outer element 52 (FIG. 2), which fit concentrically around the shaft 8 in the absence of the cone 16 and rollers 22 for the upper bearing 6 and establish surfaces from which the spacing between the front faces 28 of cones 16 may be measured remote from the housing 10. The inner element 50 fits around the shaft 8 with only enough clearance to slide easily over the shaft 8. At its lower end it bears against the front face 28 of the cone 16 for the bearing 4 which is of course on the shaft 8 in the position that it will assume during the normal use and operation of the assembly B. At its upper end, the inner element 50 has a reference surface 54. A length a exists between the bottom surface, which bears against the front face 28 of the lower cone 16, and the reference surface 54, and that distance is known. In other words, the length a of the inner element 50 is constant and is known. Thus, the inner element 50, in effect, projects the front face 28 of the lower cone 16 out of the housing a known distance a.

Actually, the inner element 50 rises well above the upper end of the shaft 8, and its upper end consists of a short spindle 56 that projects from an annular shoulder 58 and lies along the axis X. The reference surface 54 is at the upper end of the spindle 56 where it lies perpendicular to the axis X. The inner element 50 carries a floating member 60 which fits around the spindle 56 with a slight clearance and is supported on the shoulder 58 by a Belleville spring 62. Thus, the floating member 60 is capable of moving toward the shoulder 58 against the bias of the spring 62. The floating member 60 has another reference surface 64, which like the surface 54 is presented upwardly and lies in a plane perpendicular to the axis X.

The outer measuring element 52 of the apparatus A encircles the inner element 50 and in effect projects the cup 12 of the upper bearing 6 out of the housing 10. At its lower end, the outer element 52 has a tapered external surface 66, the taper of which corresponds to the taper of the raceway 14 on the upper cup 12. Moreover, the diameter of the surface 66 is compatible with the tapered raceway 14 of upper cup 12, in the sense that the surface 66 will seat against the raceway 14 of the upper cup 12 much the same as the tapered rollers 22 for the upper cone 16 normally seated along that raceway. At its upper end the outer element 52 has a tapered internal surface 68, the taper and diameter of which match the taper and diameter of the raceway 14 for the upper cup 12. The outer element 52, in effect, lifts the raceway 14 of the upper cup 12 a distance b away from its initial position, the distance b being the distance between equivalent diameters on the tapered external and internal surfaces 66 and 68.

The cone 16 for the upper bearing 6 and its set of rollers 22 fit into the tapered internal surface 68 at the upper end of the outer element 52 and when so positioned, the front face 28 of the upper cone 16 will bear against the reference surface 64 on the floating member 60. The back face 26 of the upper cone 16 is presented upwardly against a force ring 70 to which is applied an axially directed force that is sufficient in magnitude to drive the upper cone 16 downwardly against the force exerted by the spring 62 and bring the rollers 22 of the upper bearing 6 against the tapered raceway 18 of the cone 16 and the tapered internal surface 68 of the outer element 52. With the force applied to the ring 70, the outer element 52 is rotated or oscillated relatively slowly and this causes the rollers 22 of the two bearings 4 and 6—and particularly the rollers 22 of the upper bearing 6—to move up the tapers of the raceways 18 for the two cones 16 to the thrust ribs 20 and to bear against the thrust ribs 20. In short, the rotation or oscillation of the outer element 52 brings the rollers 22 to the positions on the cones 16 that they would normally assume in the operation of the bearings 4 and 6.

The gauging apparatus A also includes a tubular member 72 (FIG. 2) which fits loosely through the force ring 70 and within the bore of the upper cone 16. The lower end of the tubular member 72 bears against the reference surface 64 of the floating member 60 and thus assumes the position of the front face 28 of the upper cone 16 since that face likewise bears against the reference surface 64. At its upper end the tubular member 72 is fitted with a gauge 74 having a probe 76 which extends downwardly through the hollow interior of the tubular member 60 and bears against the reference surface 54 at the upper end of the inner element 50. The gauge 74, in effect, measures the distance c between the reference surface 54 at the upper end of the inner element 50 and the reference surface 64 on the disk 60.

When the rollers 22 of the two bearings 4 and 6 are fully seated against the raceways 14 of their respective cups 12 and the raceways 18 and thrust ribs 20 of their respective cones 16 and the nut 42 is tightened, a distance f (FIG. 1) will exist between the front faces 28 of the two cones 16. The distance f equals the difference between the distance g between the two cones front faces 28 in the apparatus A and the distance b between equivalent diameters on the tapered surfaces, plus an adjustment h representing the displacement of the front face 28 of the cone 16 for the upper bearing 6 owing to the press fit over the cylindrical surface 38 of the shaft 8, plus the desired setting i, or in other words:

$$f=(g-b)+h+i$$

The distance g between the cone front faces 28 in the apparatus A equals the length a of the inner element 50 plus the distance c measured by the gauge 74, that is to say:

$$g=a+C$$

Now the actual distance f between the front faces 28 of the two cones 16 when in the housing 10 may be determined from three known distances a, b, and c simply by substituting known quantites for the unknown distance g in the basic formula, that is to say:

$$f=(g-b)+h+i=[(a+c)-b]+h+i$$

Being pressed over the cylindrical surface 38 of the shaft 8, the cone 16 of the upper bearing 6 undergoes a radial expansion. The enlargement of its tapered raceway 18 causes the front face 28 of the upper cone 16 to back away a distance or displacement h from the position it would otherwise assume. The displacement h may be obtained from mathematical formula known to bearing designers. The setting i of course represents the end play or preload desired for the bearings 4 and 6. If end play is desired, the magnitude i of the end play is added; but if preload is desired, the magnitude i of the preload, expressed as a lineal dimension, should be subtracted.

Once the length f of the spacer 2 is determined, a spacer 2 of that length f is selected or an existing spacer 2 is ground to that length f. Then the pinion assembly B is assembled with the spacer 2. As the nut 42 is turned down over the threads 36 of the shaft 8 during the final steps of assembly, the cones 16 of the two bearings 4 and 6 and the spacer 2 are clamped firmly between the pinion 34 and the drive flange 40. The spacer 2, of course, establishes the setting for the two bearings 4 and 6.

The apparatus A can measure the distance f for only one type of pinion assembly B—one in which the taper of the cup raceway 14 for the upper bearing 6 matches the taper of the surfaces 66 and 68 on the outer element 52 of the apparatus A. In that sense, the apparatus A is dedicated to a specific pinion assembly B or more accurately a specific series for the upper bearing 6. But some assembly lines carry different types of pinion assemblies B with the different types perhaps alternating along such lines. The measuring apparatus C (FIGS. 3 & 4) of the present invention has the capacity to measure the distance f for two different types of pinion assemblies B and D.

Figure 4:
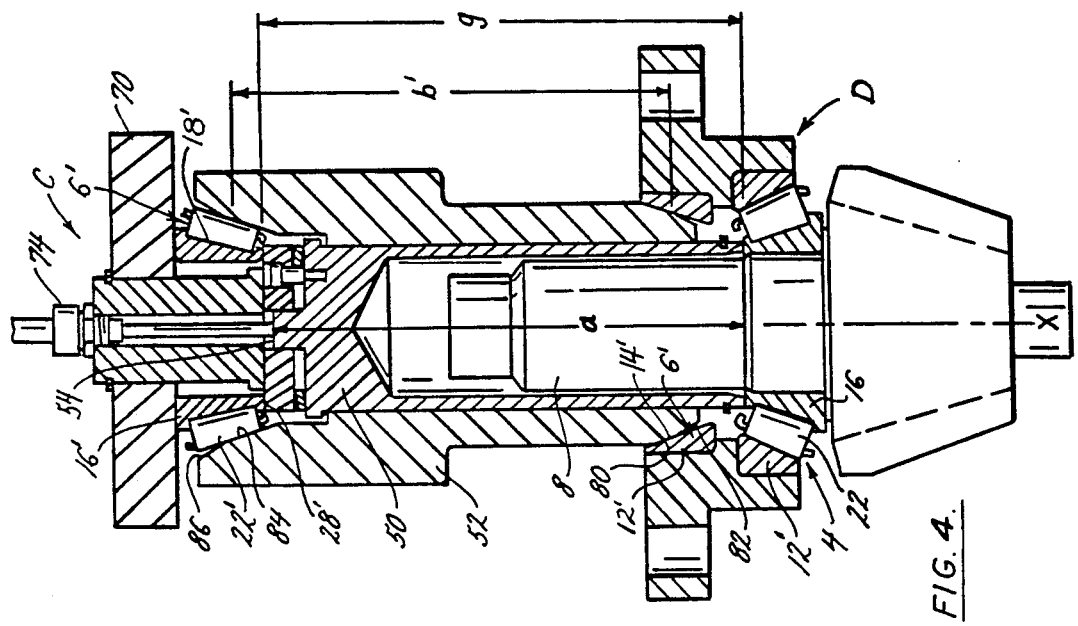
FIG. 4 is a sectional view of another type of pinion assembly with the gauging apparatus of the present invention used to determine the length of a spacer for bearings of another series.
Figure 3:
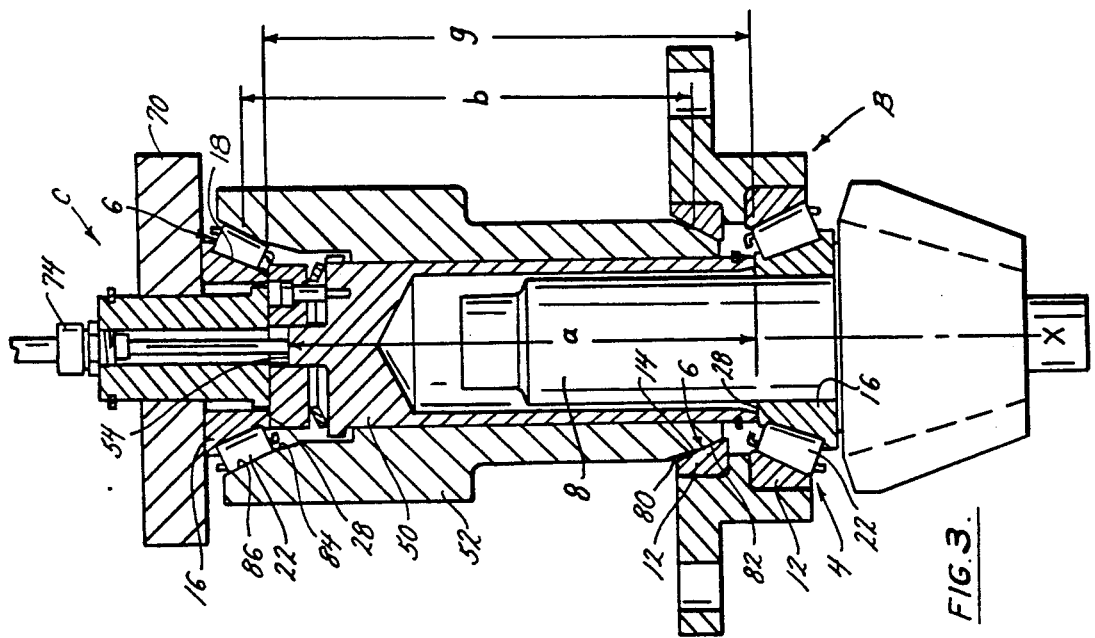
FIG. 3 is a sectional view of one type of pinion assembly with the gauging apparatus of the present invention used to determine the length of a spacer for bearings of one series.

The principal difference between the gauging apparatus A and the gauging apparatus C resides in the outer element 52 (FIGS. 3 & 4). Whereas the outer element 52 of the apparatus A has a single external tapered surface 66 at its lower end and a single internal surface 68 at its upper end, the outer element 52 of the apparatus C has two tapered external surfaces 80 and 82 at its lower end and two tapered internal surfaces 84 and 86 at its upper end. The surface 80 lies adjacent and indeed contiguous to the surface 82, but is axially displaced from the surface 82. Likewise, the surface 84 lies contiguous to the surface 86, but is axially displaced from the surface 86. Moreover, the taper of external surface 80 at the lower end corresponds to the taper of the internal surface 84 at the upper end and their diameters are compatible. Likewise, the taper of the external surface 82 at the lower end corresponds to the taper of the internal surface 86 at the upper end and the diameters are compatible. The taper of the surfaces 80 and 84 is less than the taper of the surfaces 82 and 86.

Figure 5:
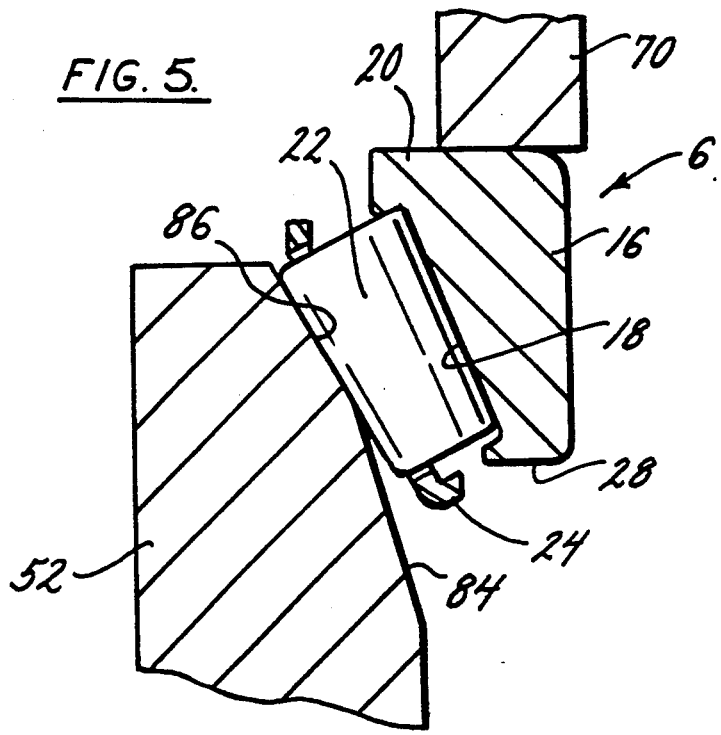
FIG. 5 is an enlarged fragmentary view in section showing rollers of one bearing series seated against the gauging apparatus.

Actually the taper of the external and internal surfaces 82 and 86 corresponds to the taper of the external and internal surfaces 66 and 68 on the outer element of the measuring device A, and hence the measuring device A is suitable for selecting the spacer 2 required for the pinion assembly B. One simply uses the procedure previously described in connection with the conventional apparatus A. When so used, the external surface 82 of the outer element 52 seats against the tapered raceway 14 of the upper cup 12 for the upper bearing 6, while the rollers 22 of the upper bearing 6 seat against the internal surface 86 (FIGS. 3 & 5). The distance b lies between equal diameters on the tapered surfaces 82 and 86 and is used in the formulas.

Figure 6:
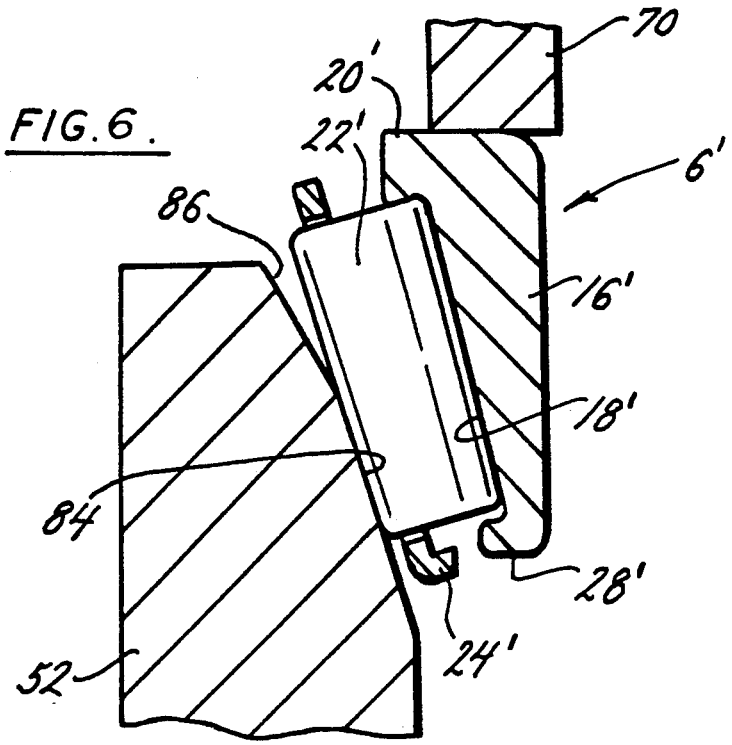
FIG. 6 is an enlarged fragmentary view in section showing rollers of another bearing series seated against the gauging apparatus.

However the raceways 14' and 18' for the upper bearing 6' for the pinion assembly D lie at a lesser angle to the axis X, and as to the raceway 14' for the cup 12' that angle equals the angle for the tapered external and internal surfaces 80 and 84 on the outer measuring element 52 for the apparatus C. Indeed, the external surface 80 seats against raceway 14' for the upper cup 12' in the assembly D, whereas the rollers 22' for the upper bearing 6' of the assembly D seat against the internal surface 84 (FIGS. 4 & 6). The distance b' lies between equal diameters on the surfaces 80 and 84. To determine the length f of the spacer 2 for the pinion assembly D, one uses the procedure previously described in connection with the apparatus A and pinion assembly B, but substitutes the distance b' for the distance b in the formulas.

Thus, the gauging apparatus C permits an assembly line to accommodate two types of pinion assemblies B and D, that is, pinion assemblies containing upper bearings 6 and 6' of differing series, without any loss in speed or accuracy.

This invention is intended to cover all changes and modifications of the example of the invention herein chosen for purposes of the disclosure which do not constitute departures from the spirit and scope of the invention.

What is claimed is:

1. An apparatus for determining the length of a spacer that fits between end faces on corresponding positioned races of first and second antifriction bearings that support a shaft within a housing and permit relative rotation between the shaft and the housing about an axis, with the spacer establishing a setting for the bearings, each bearing having the capacity to transmit radial and axial loads and including an inner bearing component that fits around the shaft and has an outwardly presented surface that is inclined with respect to the axis, and an outer bearing component which is fitted into the housing and has an inwardly presented surface that is likewise inclined to match the inclination of the inclined outwardly presented surface on the inner component, one of the components being a race with its inclined surface being a raceway on that race, the other component being another race having a raceway and rolling elements located around the raceway with its inclined surface being formed by the rolling elements, said apparatus determining the length of the spacer while the first bearing is around the shaft and in the housing with its rolling elements seated against the raceways of its races and while one of the components of the second bearing is withdrawn and the other component of the second bearing is within the interior of the housing, one of the positioned races between which the spacer will fit being on the withdrawn component of the second bearing and the other being on the like component of the first bearing, said apparatus comprising: a first measuring element which is adapted to extend axially into the housing and at its end bear against the end face of the positioned race of the first bearing, the first element having a reference surface located axially from the end which will bear against the positioned race of the first bearing so as to in effect project the end face of that race out of the housing; a second measuring element having at one end a first inclined surface which matches the inclination and diameter of the inclined surface on the remaining component of the second bearing and will fit against that inclined surface, and a second inclined surface located axially from the first inclined surface with the inclination of the second surface matching that of the first surface so as to in effect project the inclined surface of the remaining component for the second bearing out of the housing, the diameter of the second surface on the second measuring element corresponding generally to the diameter of the inclined surface on the remaining component so that the second surface will accommodate the withdrawn component of the second bearing with the end face on the positioned race of that component presented toward the end face of the positioned race of the first bearing, and means for measuring the distance between the reference surface on the first element and the end face of the positioned race on the withdrawn component when the inclined surface of that component is against the second inclined surface of the second measuring element, the improvement comprising: a third inclined surface located on the second measuring element and being offset axially from the first inclined surface and further being at a different inclination with respect to the axis, with the inclination matching the inclination of the inclined surface on a remaining component for a different second bearing, and a fourth inclined surface on the second measuring element where it is offset axially from the second inclined surface, the inclination of the fourth surface matching the inclination of the third surface and the diameter of the fourth surface corresponding generally to the diameter of the inclined surface on the withdrawn component of the different second bearing, whereby the apparatus will determine the lengths of spacers for sets of bearings having different inclined surfaces on the components of their second bearings.

2. An apparatus according to claim 1 wherein the third surface on the second measuring element is adjacent to the first surface and the fourth surface is adjacent to the second surface.

3. An apparatus according to claim 2 wherein the first and third surfaces of the second measuring element are presented radially outwardly and the second and fourth inclined surfaces are presented radially inwardly.

4. An apparatus according to claim 1 wherein the second and fourth inclined surfaces on the second measuring element will present the withdrawn component of the second bearing with the end face of its race perpendicular to the axis and the reference surface of the first measuring element is perpendicular to the axis.

5. An apparatus for determining the setting for first and second tapered roller bearings which support a shaft within a housing and permit relative rotation between the shaft and housing about an axis, each bearing including a cone that fits around the shaft and has a tapered raceway presented outwardly away from the shaft and a front face at the small end of its raceway, a cup fitted to the housing and having a tapered raceway presented inwardly toward the raceway of the cone, and a single row of tapered rollers located between and normally contacting the raceways of the cone and cup, the bearings being mounted in the indirect configuration so that the front faces of the two cones are presented toward each other along the shaft, said apparatus determining the length of a spacer that fits between the front faces of the two cones and establishes the setting for the bearings, with the determination being made while rollers for the first bearing are seated against the raceways for the cone and cup of that bearing and the cone and rollers of the second bearing are removed from the shaft to expose within the housing the front face of the cone for the first bearing and the raceway for the cup of the second bearing, said apparatus comprising: a first measuring element which is adapted to fit into the housing along the shaft and at one end will bear against the front face of the cone for the first bearing, the first measuring element having at its opposite end a reference surface which is located a known distance from the end which bears against the cone of the first bearing; a second measuring element having at one end a first external tapered surface which matches the taper of the raceway for the cup of the second bearing and will fit against that raceway, and a second external tapered surface which has a different taper to match the taper of the raceway for the cup for a different second bearing and will fit against that raceway, the two external tapered surfaces being located at different angles with respect to the axis, the second measuring element at an opposite end having a first internal tapered surface which matches the taper of the first external tapered surface, so that the cones and rollers of the second bearing may be fitted into the first internal tapered surface with the rollers seated against that surface and the front face of the cone presented toward the interior of the housing, the second measuring element at its opposite end also having a second internal tapered surface which matches the taper of the second external tapered surface so that the cones and rollers of the different second bearing may be received in the second internal tapered surface with the rollers seated against that surface and with the front face of the cone for that different second bearing presented toward the interior of the housing; and means for measuring the distance between the reference surface on the first measuring element and the front face for the cone of either second bearing when the tapered rollers of the second bearing are seated between the raceway for the cone of the second bearing and the internal tapered surface corresponding to the external tapered surface which fits against the raceway of the cup for the second bearing.

6. An apparatus according to claim 5 wherein the first measuring element is hollow and large enough to fit over the shaft and the second measuring element is hollow and large enough to fit over the first element.

7. An apparatus according to claim 6 wherein the outwardly and inwardly presented tapered surfaces on the second element are concentric and have their centers along the axis.

8. An apparatus according to claim 7 wherein the outwardly presented tapered surfaces on the second element are contiguous and the inwardly presented tapered surfaces on the second element are contiguous.

9. An apparatus according to claim 7 wherein the inwardly presented surface against which the rollers of the second bearing seat on the second measuring element will present the front face of the cone for the second bearing in a plane perpendicular to the axis.

10. An apparatus according to claim 9 wherein the reference surface on the first measuring element is perpendicular to the axis.

11. In combination with a housing, a shaft located within the housing, first and second cups fitted into the housing with each having a tapered raceway presented inwardly toward the shaft, the large ends of the tapered raceways being presented away from each other so that the cups are in the indirect configuration, a first bearing cone around the shaft and having a tapered raceway presented away from the shaft and toward the raceway of the first cup and a front face at the small end of its raceway, a first set of tapered rollers arranged in a single row between the raceways of the first cup and first cone and being seated against those raceways to establish an axis of rotation for the shaft within the housing, the first cup, first cone, and first set of rollers forming a first bearing, a second cone configured to fit over the shaft and into the second cup and having an outwardly presented raceway and a front face at the small end of the raceway, and a second set of rollers located around the raceway of the second cone and configured to seat against the raceways of the second cup and second cone when the second cone is within the second cup with its front face presented toward the front face of the first cone, the second cup, second cone and second set of rollers forming a second bearing, an apparatus for determining the length of a spacer which will locate the first and second cones such that the bearings will have the proper setting, said apparatus comprising: a first measuring element located along the axis and extended into the housing where at one end it bears against the front face of the first cone, the first measuring element having a reference surface that is axially offset from the end which bears against the front face of the first cone; a second measuring element also located along the axis and having at one end first and second tapered external surfaces, one of which matches the taper of and is compatible in diameter to the tapered raceway for the second cup, the second measuring element being fitted into the second cup with one of its tapered external surfaces seated against the raceway of the second cup, the second measuring element also having first and second tapered internal surfaces that are axially offset from the first and second tapered external surfaces and are compatible in diameter to the first and second tapered external surfaces, respectively, the second cone and the tapered rollers of the second set being located within the tapered internal surface that corresponds to the tapered external surface that is seated against the raceway of the second cup, with the rollers being seated against that tapered internal surface and against the raceway of the second cone, all with the front face of the second cone being presented toward the front face of the first cone; and measuring means for measuring the distance between the front face of the second cone and the reference surface, whereby the length of the spacer can be determined from distance measured by the measuring means.

12. The combination according to claim 11 wherein the means for measuring the distance includes a spring-loaded element which will bear against the front face of the second cone and is urged away from that end of the first element which will bear against the front face of the first cone.

13. The combination according to claim 11 wherein the first element encircles the shaft and the second element encircles the first element.

14. The combination according to claim 11 wherein the first and second external tapered surfaces are axially offset and the first and second tapered interior surfaces are axially offset.

15. The combination according to claim 14 wherein the first and second tapered external surfaces are contiguous.

16. The combination according to claim 11 and further comprising a different second bearing having a raceway on its cup which matches the taper of the other external surface on the second measuring element.

17. A process for determining the settings for two different types of assemblies, each of which includes a housing, a shaft located in the housing and first and second tapered roller bearings mounted in the indirect configuration to permit relative rotation between the shaft and housing about an axis of rotation, each bearing having a cone located around the shaft and provided with an outwardly presented tapered raceway and a front face at the small end of the tapered raceway, a cup located in the housing and provided with an inwardly presented tapered raceway and tapered rollers arranged in a single row between the cone and cup and contacting the raceways of the cone and cup, the assemblies differing at least in the inclination of the raceways for their second bearings, said process comprising: inserting a first measuring element into the housing with the cone and rollers of the second bearing removed and bringing the end of the first measuring element against the front face of the first cone, the first measuring element carrying a reference surface that is axially offset from the end which bears against the front face of the cone on the first bearing whereby a distance g exists between the front face of the first cone and the reference surface; while the cone and rollers of the second bearing are still removed, bringing the end of a second measuring element into the cup of the second bearing and seating one of two tapered external surfaces that are on the second element against the raceway of the cup; placing the cone and the rollers of the second bearing into the second measuring element with the front face of the cone presented toward the interior of the housing and bearing against the reference surface carried by the first element; causing the rollers of the second bearing to seat against the raceway of the cone and against one of two tapered internal surfaces on the second element with that surface in taper matching the taper of the external surface which bears against the raceway of the cup for the second bearing, there being a distance b between equivalent diameters on said one of two external and internal tapered surfaces; from a location remote from the housing, determining the difference between the distances g and b; selecting a spacer for installation between the front faces of the cones for the two bearings, the length of the spacer being determined by the difference between the distances g and b; and repeating the foregoing steps for another assembly using the other tapered external and internal surfaces of the second element to position the cone of the second bearing for that other assembly remote from the cone of the first bearing for that other assembly.

18. An apparatus for determining the setting for first and second tapered roller bearings which support a shaft within a housing and permit relative rotation between the shaft and housing about an axis, each bearing including a cone that fits around the shaft and has a tapered raceway presented outwardly away from the shaft and a front face at the small end of its raceway, a cup fitted to the housing and having a tapered raceway presented inwardly toward the raceway of the cone, and a single row of tapered rollers located between and normally contacting the raceways of the cone and cup, the bearings being mounted in the indirect configuration so that the front faces of the two cones are presented toward each other along the shaft, said apparatus determining the length of a spacer that fits between the front faces of the two cones and establishes the setting for the bearings, with the determination being made while rollers for the first bearing are seated against the raceways for the cone and cup of that bearing and the cone and rollers of the second bearing are removed from the shaft to expose within the housing the front face of the cone for the first bearing and the raceway for the cup of the second bearing, said apparatus comprising: a first measuring element which is adapted to fit into the housing along the shaft and at one end will bear against the front face of the cone for the first bearing, the first measuring element carrying a reference surface against which the front face for the cone for the second bearing will bear, whereby a distance g exists between said one end of the first element and the reference surface carried by the first element; a second measuring element having at one end a first external tapered surface which matches the taper of the raceway for the cup of the second bearing and will fit against that raceway, and a second external tapered surface which matches a different taper of the raceway for the cup for a different second bearing and will fit against that raceway, the two external tapered surfaces being located at different angles with respect to the axis, the second measuring element at an opposite end having a first internal tapered surface which matches the taper of the first external tapered surface, so that the cones and rollers of the second bearing may be fitted into the first internal tapered surface ! with the rollers seated against that surface and the front face of the cone presented toward the interior of the housing and being against the reference surface carried by the first element, there being a distance b between equivalent diameters on the first external and internal tapered surfaces, the second measuring element at its opposite end also having a second internal tapered surface which matches the taper of the second external tapered surface so that the cones and rollers of the different second bearing may be received in the second internal tapered surface with the rollers seated against that surface and with the front face of the cone for that other second bearing presented toward the interior of the housing and against the reference surface carried by the first element, there being a distance b' between equivalent diameters on the second external and internal surfaces; and means for determining the difference between the distances g and b and the difference between distances g and b', whereby the size of a spacer for either type of second bearing may be determined.

* * * * *